(12) United States Patent
Nelson

(10) Patent No.: US 11,786,853 B2
(45) Date of Patent: Oct. 17, 2023

(54) FACEPIECE ELECTROSTATIC CHARGING DEVICES AND METHODS THEREOF

(71) Applicant: F.N. Smith Corporation, Oregon, IL (US)

(72) Inventor: Bryan Dennis Nelson, Rockford, IL (US)

(73) Assignee: F.N. SMITH CORPORATION, Oregon, IL (US)

( * ) Notice: Subject to any disclaimer, the term of this patent is extended or adjusted under 35 U.S.C. 154(b) by 687 days.

(21) Appl. No.: 16/988,799

(22) Filed: Aug. 10, 2020

(65) Prior Publication Data

US 2022/0040616 A1 Feb. 10, 2022

(51) Int. Cl.
| | | |
|---|---|---|
| *H01T 23/00* | (2006.01) | |
| *B01D 46/00* | (2022.01) | |
| *A62B 23/02* | (2006.01) | |
| *A41D 13/11* | (2006.01) | |
| *A62B 18/02* | (2006.01) | |

(52) U.S. Cl.
CPC ..... *B01D 46/0001* (2013.01); *B01D 46/0032* (2013.01); *A41D 13/11* (2013.01); *A62B 18/025* (2013.01); *A62B 23/025* (2013.01); *B01D 2279/00* (2013.01)

(58) Field of Classification Search
None
See application file for complete search history.

(56) References Cited

U.S. PATENT DOCUMENTS

| | | | |
|---|---|---|---|
| 2,740,184 | A | 4/1956 | Thomas |
| 3,571,679 | A | 3/1971 | Turnhout |
| 4,215,682 | A | 8/1980 | Kubik et al. |
| RE31,285 | E | 6/1983 | van Turnhout et al. |
| 4,536,440 | A | 8/1985 | Berg |
| 5,288,298 | A * | 2/1994 | Aston ................ B01D 46/0038 96/135 |
| 5,374,458 | A | 12/1994 | Burgio |
| 5,496,507 | A | 3/1996 | Angadjivand et al. |

(Continued)

FOREIGN PATENT DOCUMENTS

GB 2103491 A 2/1983

OTHER PUBLICATIONS

Biermann, A. H. et al., "Evaluation of Permanently Charged Electrofibrous Filters", Oct. 18, 1982, pp. 1-30.

(Continued)

*Primary Examiner* — Stephen W Jackson
(74) *Attorney, Agent, or Firm* — Troutman Pepper Hamilton Sanders LLP (Rochester)

(57) ABSTRACT

A facepiece charging device comprising a receptacle system, an electrostatic charging system, and a support structure. The receptacle system is configured to detachably receive and secure a facepiece. The electrostatic charging system is configured to transfer an electrostatic charge to the facepiece when energized. The support structure has a moveable guide (Continued)

system coupled to at least one of the receptacle system or the electrostatic charging system. The moveable guide system has at least an engaged position where the receptacle system is adjacent the electrostatic charging system to electrostatically charge the facepiece and a disengaged position where the receptacle system is spaced from the electrostatic charging system.

12 Claims, 3 Drawing Sheets

(56) References Cited

U.S. PATENT DOCUMENTS

| | | | |
|---|---|---|---|
| 5,641,555 | A | 6/1997 | Berrigan et al. |
| 5,741,341 | A * | 4/1998 | Stanek ............... B01D 46/001 55/467 |
| 6,159,325 | A * | 12/2000 | Graham ................. G09F 7/12 156/267 |
| 7,131,442 | B1 | 11/2006 | Kronzer et al. |
| 8,794,238 | B2 | 8/2014 | Nguyen et al. |
| 2010/0307332 | A1 * | 12/2010 | Yuen ..................... B03C 3/383 96/25 |
| 2017/0318876 | A1 | 11/2017 | Duffy |
| 2021/0315297 | A1 * | 10/2021 | Brady ................... A62B 23/02 |

OTHER PUBLICATIONS

Pillai, P.K.C. et al., "Electrets and Their Applications in Contamination Studies", NASA Technical Report NASA TR R-457, Dec. 1975.

Choi, D. Y. et al., "Al-Coated Conductive Fiber Filters for High-Efficiency Electrostatic Filtration: Effects of Electrical and Fiber Structural Properties" Scientific Reports, Apr. 10, 2018, pp. 1-10.

Bergman, M.S. et al., "Impact of Three Cycles of Decontamination Treatments on Filtering Facepiece Respirator Fit", Journal of the International Society for Respiratory Protection, vol. 28, No. 1, 2011. pp. 48-59.

"What is an N95 Respirator?", N95 Schematic Release, V1.2, Apr. 27, 2020.

Liao, L. et al., "Can N95 Facial Masks be Used After Disinfection? And for How Many Times?", Stanford University and 4C Air, Inc., Mar. 25, 2020, pp. 1-8.

Wente, V. A., "Superfine Thermoplastic Fibers", Industrial Engineering Chemistry, vol. 48, pp. 1342 et seq. (1956).

* cited by examiner

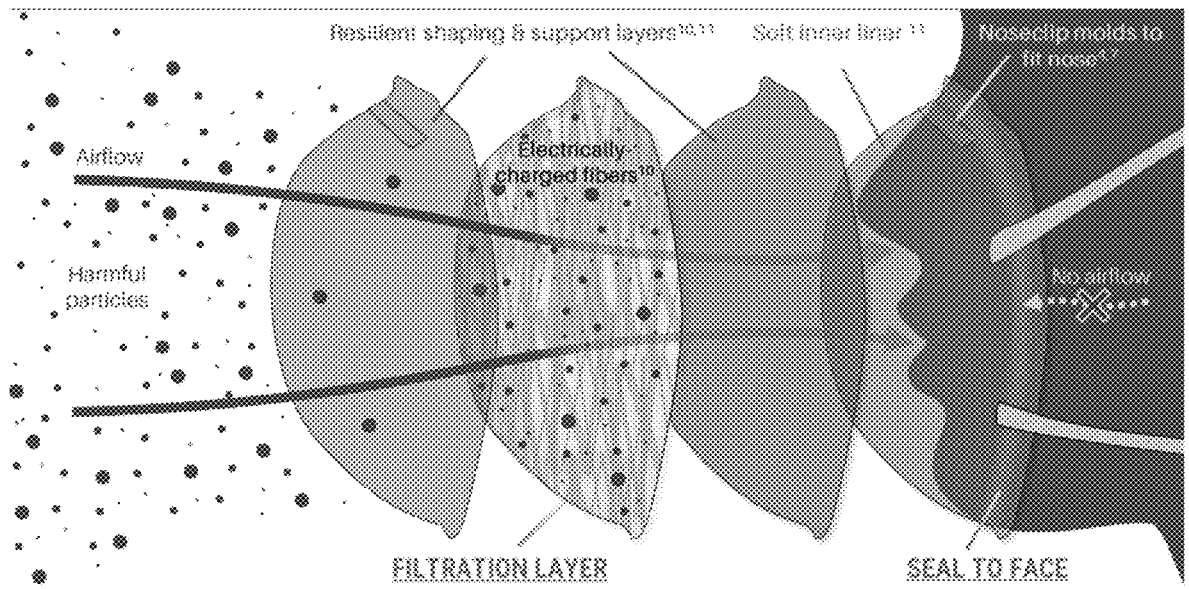
FIG. 1 – Prior Art
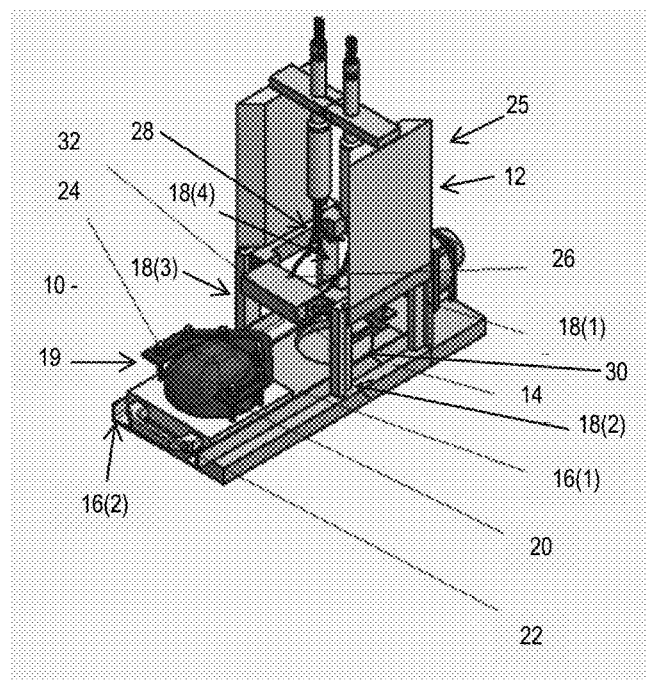
FIG. 2

FACEPIECE ELECTROSTATIC CHARGING DEVICES AND METHODS THEREOF

FIELD

This technology generally relates to devices that refurbish facepiece respirators and, more particularly, to facepiece electrostatic charging devices and methods thereof.

BACKGROUND

Personal protective equipment is used by many industries and in a variety of settings to help protect users from foreign substances that could be harmful. The use of personal protective equipment reduces risks that can be present in various types of environments, such as environments which may expose individuals to certain foreign substances or other biological hazards.

In particular, one type of personal protective equipment is an N95 filtering facepiece respirator which is used by multiple industries and other personal or business environments to limit the exposure of individuals to foreign substances. An example of a prior art N95 type filtering facepiece respirator is shown in the exploded view in FIG. 1. As illustrated, the respirator has multiple layers including in this example a filtration layer between a pair of resilient shaping support layers along with a soft inner liner for user comfort each of which provides some filtration.

With an increase in layers, the respirator would increase its efficiency, but would increase the pressure drop required across the filter. In order to increase filtration efficiency, without creating a filter medium that causes an excessive pressure drop, the respirator uses the filtration layer comprising dielectric polymer fibers that have an electrostatic charge applied to filter out smaller particulate matter utilizing the coulomb force which results in the attraction of the small particles. The ability to filter this small particulate matter has become critical in controlling the spread of infectious diseases.

Unfortunately, over time the electrostatic charge in the filtration layer deteriorates reducing the effectiveness of these respirators which now are more commonly being used for extended periods of time. Additionally, to extend the life of these respirators, liquid aerosols or other liquids have been used to sanitize these respirators, but contact with these liquids deteriorates the electrostatic charge reducing the filtration capacity.

SUMMARY

A facepiece charging device comprising a receptacle system, an electrostatic charging system, and a support structure. The receptacle system is configured to detachably receive and secure a facepiece. The electrostatic charging system is configured to transfer an electrostatic charge to the facepiece when energized. The support structure has a moveable guide system coupled to at least one of the receptacle system or the electrostatic charging system. The moveable guide system has at least an engaged position where the receptacle system is adjacent the electrostatic charging system to electrostatically charge the facepiece and a disengaged position where the receptacle system is spaced from the electrostatic charging system.

A method for making a facepiece charging device includes configuring a receptacle system to detachably receive and secure a facepiece. An electrostatic charging system is configured to transfer an electrostatic charge to the facepiece when energized. A support structure having a moveable guide system coupled to at least one of the receptacle system or the electrostatic charging system is provided. The moveable guide system has at least an engaged position where the receptacle system is adjacent the electrostatic charging system to electrostatically charge the facepiece and a disengaged position where the receptacle system is spaced from the electrostatic charging system.

Examples of this technology provide a number of advantages including providing an effective and efficient facepiece electrostatic charging device that can increase an electrostatic charge that has weakened in a filtering facepiece respirator. With this technology, filtering layers of facepiece respirators can be quickly and safely recharged in large volumes to satisfy the growing need to sanitize and return facepiece respirators to necessary filtration level because of ongoing shortages of facepiece respirators. Additionally, examples of this technology are not only able to recharge facepiece respirators to at or near original filtration specifications, but may in some examples be able recharge facepiece respirators to have enhanced filtration capabilities, e.g. recharging an N95 mask to have filtration capabilities comparable to an N99 mask. Further with examples of this technology the electrostatic charge can be advantageously applied multiple times to the same filtering facepiece respirator after decontamination cycles.

BRIEF DESCRIPTION OF THE DRAWINGS

FIG. 1 is an exploded view of a prior art example of an N95 filtering facepiece respirator;

FIG. 2 is a perspective view of an example of a facepiece electrostatic charging device;

DETAILED DESCRIPTION

Figure 3:
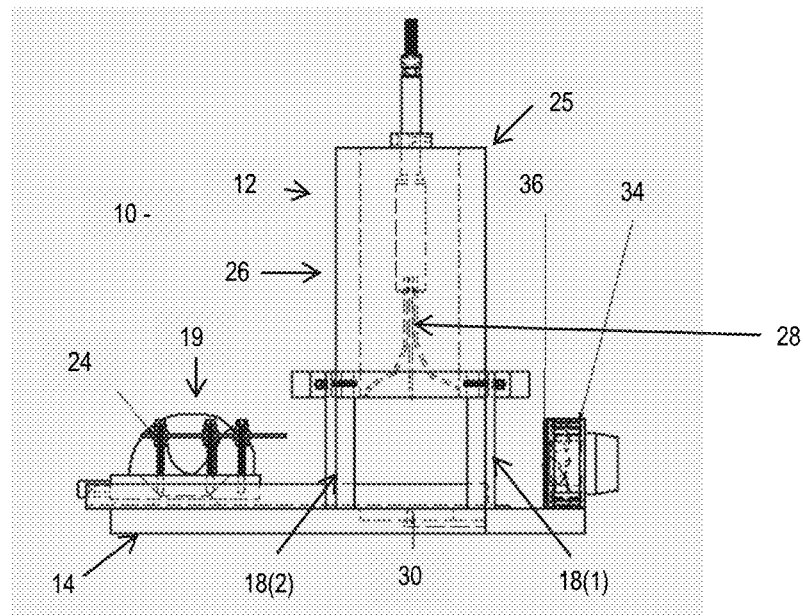
FIG. 3 is a side view of the example of the facepiece electrostatic charging device shown in FIG. 2.
Figure 4:
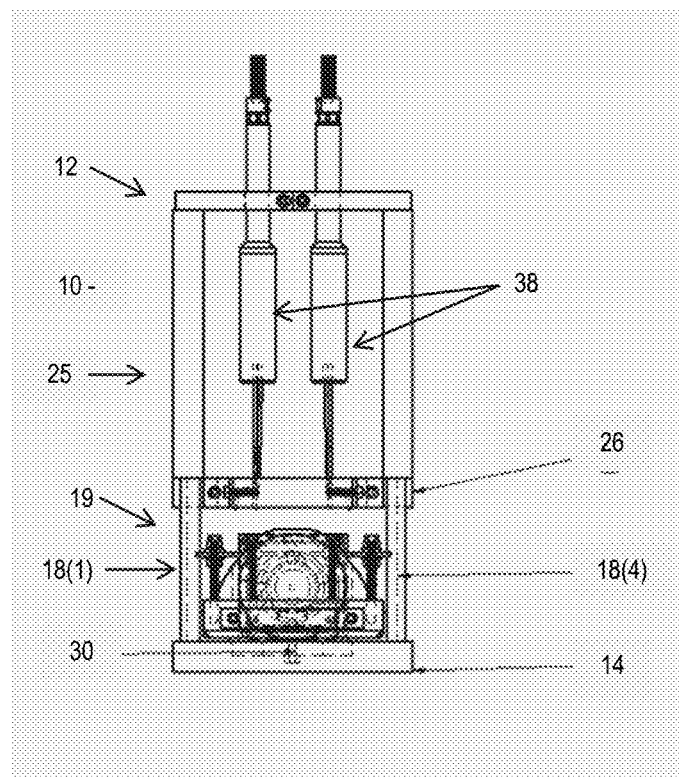
FIG. 4 is an end view of the example of the facepiece electrostatic charging device shown in FIG. 2.

An example of a facepiece electrostatic charging device 10 is illustrated in FIG. 1. In this example, the facepiece electrostatic charging device 10 has a support structure 12, a base plate 14, side rails 16(1)-16(2), vertical guide rails 18(1)-18(4), a mask tray 20, a tray handle 22, a gasket 24, an electrostatic carriage 26, an upper electrode 28, a lower electrode 30, a power source 32, a fan 34 with a fan guard 36, and electrostatic pinners 38, although the device 10 could have other types and/or numbers of other components or other elements in other configurations. As illustrated and described by way of the examples herein, this exemplary technology provides a number of advantages including providing an effective and efficient facepiece electrostatic charging device that can increase an electrostatic charge that has weakened in a filtering facepiece respirator.

Referring more specifically to FIGS. 2-5, in this example the support structure 12 of the facepiece electrostatic charging device 10 includes the base plate 14, the side rails 16(1)-16(2), and the vertical guide rails 18(1)-18(4), although the support structure 12 may comprise other types and/or numbers of other components or other elements in other configurations. Additionally in this example, the base plate 14 has an upper surface on which the pair of spaced apart and substantially parallel slide rails 16(1)-16(2) are secured and extend in a direction along a first axis, although the base plate 14 could have other numbers of slide rails 16(1)-16(2) and other types of mechanisms to move the mask tray 20 may be used. Further in this example the base plate 14 also has the vertical guide rails 18(1)-18(4) which are secured adjacent one end to the upper and extend in a direction along a second axis, although the base plate 14 could have other numbers of the vertical guide rails 18(1)-18(4) and other types of mechanisms to move the electrostatic carriage may be used. As illustrated in FIGS. 2-5, in this example the first axis and the second axis have an intersection point adjacent a location where electrostatic charge may be delivered to a filtering facepiece respirator.

A receptacle system 19 of the facepiece electrostatic charging device 10 includes the mask tray 20 with the tray handle 22 and the gasket 24, although the receptacle system 19 may comprise other types and/or numbers of other components or other elements in other configurations. The receptacle system 19 is configured to quickly and safely detachably receive and secure a filtering facepiece respirator to be moved into position for a recharging operation and then moved back out, although other types of moveable or fixed receptacle systems may be used. In this example, the mask tray 20 has a lower surface which is shaped to slidably mate with the slide rails 16(1)-16(2) to enable the mask tray 20 to travel in a direction along the first axis, although other types of engagement mechanisms with the slide rails 16(1)-16(2) may be used. Additionally in this example, the tray handle 22 may be used to facilitate movement of the mask tray 20 along the slide rails 16(1)-16(2), although other manual or automated mechanisms to move the filtering facepiece respirator to receive an electrostatic charge and then back out may be used. The gasket 24 in this example is coupled to and spaced from a surface of the base tray 20 to define an opening to detachably receive and secure a filtering facepiece respirator between the base tray 20 and the gasket 24, although other mechanisms for detachably securing a filtering facepiece respirator for the electrostatic charging process may be used. Further in this example, the gasket 24 may be made of a dielectric material and may define a U-shaped structure to facilitate receiving and detachably securing a filtering facepiece respirator. Additionally, the gasket 24 may be shaped and positioned on the base tray 20 in a manner that would block and shield any conductive materials typically found on the filtering facepiece respirator, such as a nose clip, from the electrostatic charge being applied. As illustrated in FIG. 2, a metal nose clip on the filtering facepiece respirator would be safely seated under the gasket 24 in this example.

Referring to FIGS. 2-6, an electrostatic charging system 25 of the facepiece electrostatic charging device 10 includes the electrostatic carriage 26, the upper electrode 28, the lower electrode 30, the power source 32, and the electrostatic pinners 38, although the electrostatic charging system 25 may comprise other types and/or numbers of other components or other elements in other configurations. In this example, the electrostatic carriage 26 is configured to have a structure at each corner sized to slidably mate with the vertical guide rails 18(1)-18(4) to enable the electrostatic carriage 26 to travel in a direction along a second axis, although other types of engagement mechanisms with the vertical guide rails 18(1)-18(4) may be used and the electrostatic carriage 26 may be in a fixed position in other examples. Additionally, in this example the electrostatic pinners 38 are coupled between the upper electrode 28 and the power source 32 and are secured to the electrostatic carriage 26, although other types of mechanisms to deliver an electrostatic charge may be used. The electrostatic pinners 38 are configured to generate an electrostatic charge which is coupled to the upper electrode 28, although other manners for generating the electrostatic charge may be used. Further, in this example the upper electrode 28 may comprise multiple prongs which extend out from an end of the upper electrode 28 to engage a greater surface area of the filtering facepiece respirator when delivering an electrostatic charge, such as the three prongs shown in FIG. 6 along with the lines illustrating a field for the delivery of the electrostatic charge or in other examples may in a form that closely approximates the shape of the filtering facepiece respirator to facilitate charging. Further in this example, the lower electrode 30 is secured to the base plate 14 below the intersection point of the first axis and the second axis, is coupled to ground, and engages with the upper electrode 28 when the upper electrode 28 is brought in an area adjacent the lower electrode 30 near the intersection point, although in other examples only one electrode may be used. Each of the electrodes 28 and 30 may have the same or different configurations in different examples of this technology. Further, in this example the distance of one or more of the electrodes 28 may be between 1 mm to 26 mm, although other dimensions may be used.

Figure 5:
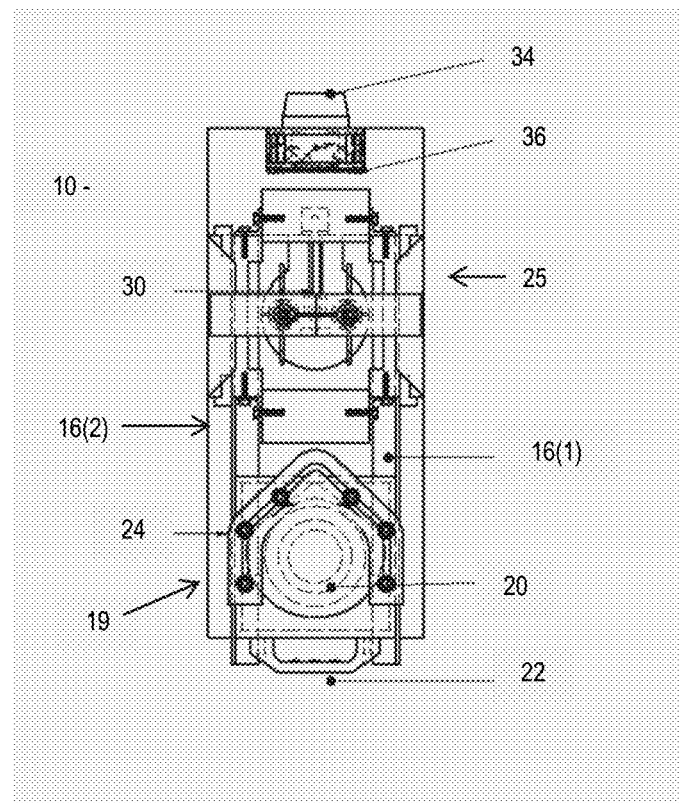
FIG. 5 is a top view of the example of the facepiece electrostatic charging device shown in FIG. 2.
Figure 6:
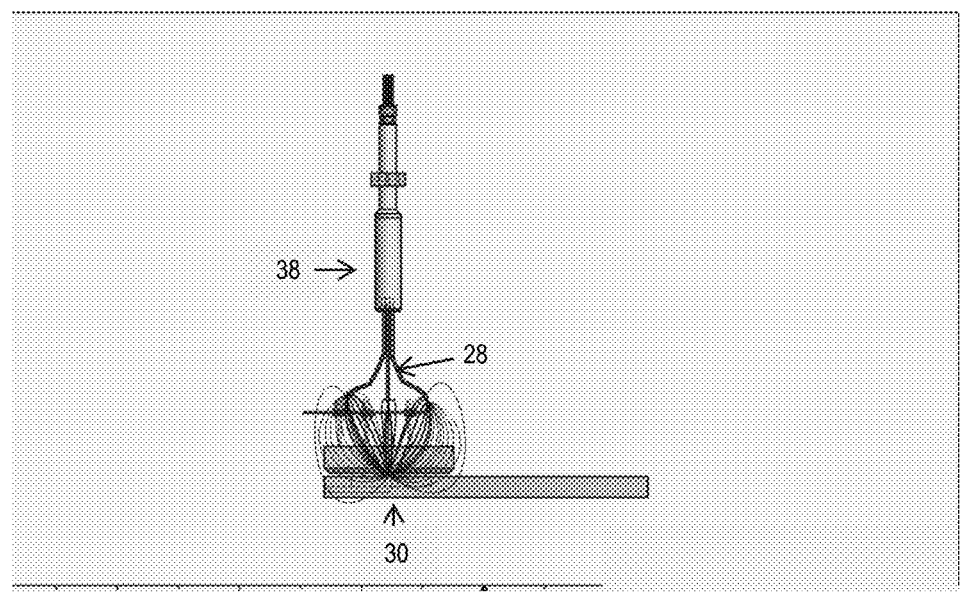
FIG. 6 is a side of one of the electrodes illustrating an exemplary functional field with exemplary charges.

Referring to FIGS. 2, 3, and 5, the fan 34 with the fan guard 36 of the facepiece electrostatic charging device 10 helps to dissipate ionized air, although other types of systems may be used. In this example, the fan 34 is coupled to the power source 32 and is positioned to direct air or other fluids towards the intersection point of the first axis and second axis.

An example of effectively and efficiently charging a filtering facepiece respirator with the example of the facepiece electrostatic charging device 10 will now be described with reference to FIGS. 2-6. In this example, a filtering facepiece respirator may be quickly and easily received and detachably secured between the base plate 14 and the gasket 24. Advantageously in this example, the gasket 24 is shaped, sized and positioned to shield any conductive materials on the filtering facepiece respirator, such as a nose clip, from electrostatic charge.

Next, movement of the receptacle system 19 is facilitated with the tray handle 22 that may be used to move the base tray 14 along the slide rails 16(1)-16(2) in a direction along the first axis to the intersection point, although in other examples either the receptacle system 19 or the electrostatic carriage system 25 may be in a fixed position with the other one moving towards either the receptacle system 19 or the electrostatic carriage system 25.

Similarly, the electrostatic charging system 25 may slide along the vertical guide rails 18(1)-18(4) in a direction along the second axis towards the intersection point, although again in other examples either the receptacle system 19 or the electrostatic carriage system 25 may be in a fixed position with the other one moving towards either the receptacle system 19 or the electrostatic carriage system 25. Although not shown the electrostatic carriage system 25 may have a handle to facilitate this movement or other manually or automated mechanisms may be used.

When the receptacle system 19 and the electrostatic carriage system 25 are positioned near the intersection point in this example, an electrostatic charge generated by the electrostatic pinners 38 is coupled between the upper electrode 28 and the lower electrode 30 to impart an electrostatic charge to the filtration layer of a filtering facepiece respirator. With this process, facepiece electrostatic charging device 10 will increase the filtering efficiency of the filtering facepiece respirator in at least one of two ways. The facepiece electrostatic charging device 10 will create an additional electrostatic charge which will be applied to the dielectric material of the filtering facepiece respirator or the facepiece electrostatic charging device 10 will create a larger coulombic attraction than that of the thermoelectret material resulting in particles being pulled off of the filtering facepiece respirator. The removal of the particles will allow the original thermoelectret material to regain filter efficiency with a reduction in particle loading of the filtering facepiece respirator. Further, with examples of this technology, the electrostatic charge in the filtration layer of a filtering facepiece respirator may be charged to at or near original specifications by the facepiece electrostatic charging device 10 and in some examples may exceed original specifications, such as charging the filtration layer of an N95 filtering facepiece respirator to an N99 filtering facepiece respirator specifications. In examples of this technology, the charge of the electrode 28 or other emitters above the filtering facepiece respirators will have a positive charge. In other examples of this technology, the charge of the electrode 28 or other emitters above the filtering facepiece respirators will have a negative charge. In yet other examples, the charge of the electrode 28 or other emitters will be at least 500 volts and in most examples will not exceed 3 million volts.

Once the filtering facepiece respirator has been charged, the base tray 14 may be slid back out along the slide rails 16(1)-16(2) and the electrostatic charging system 25 may be slide back out along the vertical guide rails 18(1)-18(4) away from the intersection point in this example. Next, the filtering facepiece respirator may be quickly and easily detachably from between the base plate 14 and the gasket 24 and the next filtering facepiece respirator may be loaded for charging.

In other examples of this technology, the facepiece electrostatic charging device 10 may include a heating system which can be used to heat the filtering facepiece respirator below the melting point to realign the charge in the electrofibrous material of the filtration layer to facilitate the charging process. Additionally, in other examples of this technology the facepiece electrostatic charging device 10 may include decontamination unit, such as one that provides a spray or cascaded of a liquid aerosol, powdered product, gaseous substance, dielectric material, conductive material, chemically neutralizing agent, or polymer for decontamination before or after charging the filtering facepiece respirator. Further, in other examples of this technology the facepiece electrostatic charging device 10 may have multiple stages of electrodes and the filtering facepiece respirators are moved under multiple emitters in these facepiece electrostatic charging devices 10 at different times to apply charges on different features of the filtering facepiece respirators, at different charge levels, for different amounts of time.

Accordingly, as illustrated and described by way of the examples herein, examples of this technology an effective and efficient facepiece electrostatic charging device that can increase an electrostatic charge that has weakened in a filtering facepiece respirator. With this technology, filtering layers of facepiece respirators can be quickly and safely recharged in large volumes to satisfy the growing need to sanitize and return facepiece respirators to necessary filtration level because of ongoing shortages of facepiece respirators. Additionally, examples of this technology are not only able to recharge facepiece respirators to at or near original filtration specifications, but may in some examples be able recharge facepiece respirators to have enhanced filtration capabilities, e.g. recharging an N95 mask to have filtration capabilities comparable to an N99 mask. Further with examples of this technology the electrostatic charge can be advantageously applied multiple times to the same filtering facepiece respirator after decontamination cycles.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A facepiece charging device comprising:
   a receptacle system configured to detachably receive and secure a facepiece;
   an electrostatic charging system configured to transfer an electrostatic charge to the facepiece when energized; and
   a support structure having a moveable guide system coupled to at least one of the receptacle system or the electrostatic charging system, wherein the moveable guide system has at least an engaged position where the receptacle system is adjacent the electrostatic charging system to electrostatically charge the facepiece and a disengaged position where the receptacle system is spaced from the electrostatic charging system.

2. The device as set forth in claim 1 wherein the receptacle system further comprises:
   a base tray; and
   a gasket coupled adjacent one end and spaced from a surface of the base tray to define an opening to detachably receive and secure the facepiece between the base tray and the gasket.

3. The device as set forth in claim 1 wherein the gasket has a shape configured to block at least a portion of the facepiece when detachably secured from exposure to electrostatic charge.

4. The device as set forth in claim 1 wherein the electrostatic charging system further comprises:
   an electrostatic carriage; and
   at least one electrode secured to the electrostatic carriage, the electrode has an end configured to deliver an electrostatic charge to the facepiece.

5. The device as set forth in claim 1 wherein the guide system further comprises:
   at least one slide rail coupled to the support structure, wherein the receptacle system is movably coupled to the at least one slide rail which extends along a first axis;
   at least one carriage rail coupled to the support structure, wherein the electrostatic charging system is movably coupled to the at least one carriage rail which extends along a second axis that intersects with the first axis adjacent a location where the electrostatic charge is applied to the facepiece.

6. The device as set forth in claim 5 further comprising:
at least one blower device positioned on the support structure to direct a fluid in a direction towards the intersect of the first axis and the second axis.

7. A method for making a facepiece charging device, the method comprising:
configuring a receptacle system to detachably receive and secure a facepiece;
configuring an electrostatic charging system to transfer an electrostatic charge to the facepiece when energized; and
providing a support structure having a moveable guide system coupled to at least one of the receptacle system or the electrostatic charging system, wherein the moveable guide system has at least an engaged position where the receptacle system is adjacent the electrostatic charging system to electrostatically charge the facepiece and a disengaged position where the receptacle system is spaced from the electrostatic charging system.

8. The method as set forth in claim 7 wherein the receptacle system further comprises:
a base tray; and
a gasket coupled adjacent one end and spaced from a surface of the base tray to define an opening to detachably receive and secure the facepiece between the base tray and the gasket.

9. The method as set forth in claim 7 wherein the gasket has a shape configured to block at least a portion of the facepiece when detachably secured from exposure to electrostatic charge.

10. The method as set forth in claim 7 wherein the electrostatic charging system further comprises:
providing an electrostatic carriage; and
securing at least one electrode to the electrostatic carriage, the electrode has an end configured to deliver an electrostatic charge to the facepiece.

11. The method as set forth in claim 7 wherein the guide system further comprises:
coupling at least one slide rail to the support structure, wherein the receptacle system is movably coupled to the at least one slide rail which extends along a first axis;
coupling at least one carriage rail to the support structure, wherein the electrostatic charging system is movably coupled to the at least one carriage rail which extends along a second axis that intersects with the first axis adjacent a location where the electrostatic charge is applied to the facepiece.

12. The method as set forth in claim 11 further comprising:
positioning at least one blower device on the support structure to direct a fluid in a direction towards the intersect of the first axis and the second axis.

* * * * *